(12) United States Patent
Pichler et al.

(10) Patent No.: US 7,787,768 B2
(45) Date of Patent: Aug. 31, 2010

(54) OPTICAL CROSS-CONNECTOR CONTAINING MULTI-STAGE CLOS NETWORK IN WHICH A SINGLE-STAGE MATRIX COMPRISES ONE STAGE OF THE CLOS NETWORK

(75) Inventors: Olaf Pichler, Backnang (DE);
Jorg-Peter Elbers, Munich (DE);
Kenneth Guild, Wivenhoe (GB)

(73) Assignee: Ericsson AB, Stockholm (SE)

( * ) Notice: Subject to any disclaimer, the term of this patent is extended or adjusted under 35 U.S.C. 154(b) by 1540 days.

(21) Appl. No.: 10/508,751

(22) PCT Filed: Mar. 18, 2003

(86) PCT No.: PCT/IB03/01469

§ 371 (c)(1),
(2), (4) Date: Apr. 13, 2005

(87) PCT Pub. No.: WO03/081944

PCT Pub. Date: Oct. 2, 2003

(65) Prior Publication Data
US 2005/0226551 A1 Oct. 13, 2005

(30) Foreign Application Priority Data
Mar. 23, 2002 (DE) .................. 102 13 133

(51) Int. Cl.
*H04J 14/00* (2006.01)
*G02B 6/26* (2006.01)
(52) U.S. Cl. .................. 398/50; 398/45; 398/48; 398/56; 398/83; 385/16; 385/17
(58) Field of Classification Search ............ 398/45–51, 398/55–57, 82, 83, 89; 370/386–388; 709/238; 385/16, 17, 24
See application file for complete search history.

(56) References Cited

U.S. PATENT DOCUMENTS 5,612,805 A * 3/1997 Fevrier et al. .................. 398/83

(Continued)

FOREIGN PATENT DOCUMENTS

EP 0 898 440 A2 2/1999

(Continued)

OTHER PUBLICATIONS

Noirie et al: "Impact of intermediate traffic grouping on the dimensioning of multi-granularity optical networks", OFC 2001, vol. 2, 2001, pp. TuG3-1 to TuG3-3.*

*Primary Examiner*—Li Liu
(74) *Attorney, Agent, or Firm*—Kirschstein, et al.

(57) ABSTRACT

A WDM optical cross-connect has input and output channels for through traffic. A first group of matrices connects the input channels to the output channels. Each input channel is connected to an input of a matrix of the first group and each output channel is connected to an output of the matrix. Input/output channels are provided for adding/dropping traffic. Each add/drop channel is connected to an input/output of a second group of matrices. The outputs/inputs of the second group of matrices are connected to inputs of a third group of matrices or outputs of a fourth group of matrices and the outputs/inputs of the third/fourth group of matrices are connected to inputs/outputs of the first group of matrices such that the matrices of the second, third and first groups of the first, fourth and second groups each form a Clos network.

13 Claims, 4 Drawing Sheets

U.S. PATENT DOCUMENTS

| | | |
|---|---|---|
| 5,903,686 A | 5/1999 | MacDonald |
| 6,005,698 A * | 12/1999 | Huber et al. ............... 398/50 |
| 6,154,583 A | 11/2000 | Kuroyanagi et al. |
| 6,208,443 B1 * | 3/2001 | Liu et al. .................. 398/9 |
| 6,567,858 B1 * | 5/2003 | Yang et al. ............... 709/238 |
| 2002/0012488 A1 | 1/2002 | Franceus |
| 2003/0044109 A1 * | 3/2003 | Maeda ..................... 385/24 |
| 2003/0152072 A1 * | 8/2003 | Guild et al. ............... 370/386 |
| 2003/0185565 A1 * | 10/2003 | Wang et al. ............... 398/49 |

FOREIGN PATENT DOCUMENTS

| | | |
|---|---|---|
| WO | WO 00/14583 | 3/2000 |
| WO | WO 01/74111 A1 | 10/2001 |

* cited by examiner

OPTICAL CROSS-CONNECTOR CONTAINING MULTI-STAGE CLOS NETWORK IN WHICH A SINGLE-STAGE MATRIX COMPRISES ONE STAGE OF THE CLOS NETWORK

BACKGROUND OF THE INVENTION

The present invention relates to wavelength division multiplex (WDM) optical communication, and more especially to an optical cross-connect (OXC) for use in a WDM optical communication network.

As is known, WDM optical communication network comprise a plurality of spatially disposed nodes which are interconnected by optical fibre waveguides in a network configuration. Networks are commonly configured as rings in which the nodes are interconnected in serial manner to form a closed loop or ring. Communication traffic is communicated between the nodes by optical radiation modulated by the communication traffic which is conveyed by the optical fibres.

Optical radiation in the context of the present patent application is defined as electromagnetic radiation having a free-space wavelength of 500 nm to 3000 nm, although a free-space of 1530 nm to 1570 nm is a preferred part of this range. In wavelength division multiplexing, the optical radiation is partitioned into a plurality of discrete non-overlapping wavebands, termed wavelength channels, or optical channels, and each wavelength channel is modulated by a respective communication traffic channel.

As is known the network nodes often include an optical add drop multiplexer (OADM) for adding/dropping selected wavelength channels to the network to thereby establish routing of communication traffic channels between nodes in dependence upon the carrier wavelength of the wavelength channel. In order to be able to selectively route (cross-connect) communication traffic between respective parts of the communication network, such as for example routing of communication traffic between interconnected rings of the network, requires the node at the interconnection of such network parts to include an optical switching capability. Such optical switching arrangements are termed optical cross-connects (OXCs) and can be broadly classified as those which are (i) non-wavelength selective and capable only of switching all WDM wavelength channels appearing at a given input fibre to a selected output fibre and consequently referred to as fibre cross-connects (FXCs), and (ii) those capable of wavelength cross-connection (interchange) which are able to cross-connect selected wavelength channels from one a given input to a selected optical output. In the case of the latter it is often desirable for the OXC to be capable of additionally adding one or more selected wavelength channel/s to the network via a selected output/s and dropping (terminating) one or more selected wavelength channel/s from the network via a selected input/s.

In this patent application an optical cross-connect (OXC) is defined as an optical switching arrangement in which all switching takes place in the optical domain. This is to be contrasted to switching arrangements, sometimes also referred to as being optical on account of them having optical inputs and outputs, in which the optical input radiation is converted to an electrical signal for switching before being converted back optical radiation.

In its simplest case, an optical switching arrangement can be regarded as an optical switching matrix in which the inputs form rows of the matrix and the outputs form columns of the matrix. At each crossing point between an input and an output, there is an optical switching element which can be selectively closed in order to connect an input to selected output.

A switching matrix which is always capable of connecting any given input to a desired output, regardless of existing connections in the matrix, is termed non-blocking. The size of a non-blocking switching matrix is determined by the product of the numbers of input and outputs, i.e. it increases quadratically with the number of connections which are required to be simultaneously established. For example, a non-blocking OXC having M optical inputs and M optical outputs each capable of supporting N wavelength channels requires an optical switching matrix of size $(M \times N) \times (M \times N)$ which for an 8 input/output, 80 wavelength channel OXC requires an optical switching matrix which is of size at least $640 \times 640$. In addition, where it is required for the OXC to be able to add/drop one or more wavelength channels, this requires the switching matrix to be correspondingly larger. OXCs which utilise a single optical switching matrix of this size are, with current technology, expensive and hard to develop. Furthermore, if the connection capacity of such a switching matrix no longer meets current demands, it has to be replaced, further increasing the cost of the communication system. An advantage of an OXC having a single switching matrix is that it is non-blocking and has a low insertion loss since there is only a single switching stage in the through path between any optical input and any optical output as well as only a single switching stage on the add/drop path.

To reduce the size of the switching matrix the optical cross-connect shown in FIG. 1 has been proposed which includes a respective smaller sized switching matrix for each wavelength channel. As will be appreciated, this OXC architecture is still single stage in that all through connections and adding/dropping of wavelength channels involves traversing a single one of the switching matrices. Referring to FIG. 1, the OXC comprises a plurality M of optical inputs and a plurality M of optical outputs, denoted I1 to IM and O1 to OM respectively (typically the inputs and outputs comprise an optical fibre). Each of the inputs is able to receive WDM radiation comprising a plurality N of wavelength channels of carrier wavelengths $\lambda 1$ to $\lambda N$. Thus the OXC has the capability for cross-connecting $M \times N$ communication channels.

Each optical input I1 to IM is connected to an input of a respective wavelength de-multiplexer D1 to DM. Each de-multiplexer, which has N outputs, spatially separates the WDM radiation appearing at its input such that a respective one of the wavelength channels appears at a respective output of the de-multiplexer.

The OXC further comprises a plurality N (one for each wavelength carrier) of switching matrices S1 to SN. Each switching matrix has at least M inputs and M outputs. (In the example illustrated in FIG. 1 the switching matrices each have M+2 inputs and outputs enabling the OXC to additionally add/drop up to two of each wavelength carriers.) A switching matrix is assigned to a respective carrier wavelength $\lambda 1$ to $\lambda N$. In the example, the switching matrix S1 is assigned for switching only communication channel having a carrier wavelength $\lambda 1$, S2 is for switching only communication channels having a carrier wavelength $\lambda 2, \ldots$, and SN is for switching only communication channels having a carrier wavelength $\lambda N$. Assignment of the switching matrices in this way is achieved by connecting the output of each of the M de-multiplexers corresponding to a given wavelength carrier, to a respective one of the inputs of the switching matrix assigned to that wavelength carrier.

Each output of each switching matrix is connected to a corresponding input of one of M multiplexers M1 to MM, which receives wavelengths $\lambda 1$ to $\lambda N$ from the various switching matrices S1 to SN at its N inputs and multiplexes these to the output O1 to OM, respectively. In order to route a communication channel correctly through the OXC, it is sufficient to supply it to the multiplexer which is connected to the required output. The input of this multiplexer at which the communication channel arrives is defined by its carrier wavelength.

The OXC of FIG. 1, in common with the OXC having a single switching matrix, has the benefit of a low insertion loss and has the further benefit that it can be upgraded when additional wavelength channels are subsequently added to the communication system. Upgrading is achieved by adding a further switching matrix for each additional wavelength channel and by increasing the number of outputs of the de-multiplexers and inputs of the multiplexers. Existing switching matrices can continue to be used without modification. Thus it is possible to build up a telecommunication network with little initial investment corresponding to the required capacity and to upgrade it according to demand.

There exists, however, a problem with adding or dropping wavelength channels with the OXC of FIG. 1. In order to be able to terminate a number A of wavelength channels without blocking, each switching matrix S1 to SN must additionally include A inputs and outputs. If the demand for dropping wavelength channels increases, this can only be satisfied by either re-assigning inputs and outputs of the switching matrices at the expense of the through-traffic (whereby the number of wavelength channels useable on the input and output is decreased), or by replacing each of the switching matrices by ones having a higher number of inputs and outputs. In the latter case, existing switching matrices can no longer be used when upgrading the OXC and the cost for an upgrade is considerably increased.

The present invention arose in an endeavour to provide an OXC which is capable of adding/dropping selected wavelength channels and whose structure is capable of being adapted to increase the number of wavelength channels that can be added/dropped whilst continuing to use existing components.

SUMMARY OF THE INVENTION

In accordance with the present invention there is provided an optical cross-connect (OXC) for use in a wavelength division multiplex (WDM) comprising: a plurality of optical inputs for receiving respective WDM communication bearing radiation; a plurality of optical outputs for outputting respective WDM communication bearing radiation switched by the OXC; a single stage optical switching matrix for switching WDM radiation between the optical inputs and outputs, wherein the optical switching matrix comprises a respective switching matrix for each wavelength channel of the WDM radiation; and a further plurality of optical inputs and outputs for respectively adding and dropping selected wavelength channels, the OXC being characterised by a respective multi-stage optical switching matrix for selectively connecting the further plurality of optical inputs and outputs to inputs and outputs of the single stage switching matrix. Preferably the multi-stage switching matrix comprises a multi-stage Clos network in which the single stage switching matrix comprises one stage of the Clos network.

More specifically in accordance with a first aspect of the invention an optical cross-connect (OXC) comprises:
a plurality of input channels for through traffic;
a plurality of output channels for through traffic;
a first group of optical switching matrices for connecting each through traffic input channel to any of the through traffic output channels, wherein each through traffic input channel is connected to an input of a switching matrix of the first group and each through traffic output channel is connected to an output of the switching matrix of the first group;
a third plurality of input channels for adding traffic, the OXC being characterised by each add traffic input channel being connected to an input of a second group of switching matrices, wherein outputs of the second group of switching matrices are connected to inputs of a third group of switching matrices and outputs of the third group of switching matrices are connected to inputs of the first group of switching matrices such that the switching matrices of the second, third and first groups form a Clos network.

Preferably the OXC further comprises a plurality of de-multiplexers, each of which has an input for connection to an optical input which carries WDM radiation comprising a plurality of wavelength channels and a plurality of outputs for outputting one of these wavelength channels to one of the through traffic input channels. Advantageously each de-multiplexer is connected to each switching matrix of the first group by one input channel. Preferably the de-multiplexers are wavelength de-multiplexers outputting a wavelength channels to an output defined according to the carrier wavelength of the wavelength channel, and the outputs of various de-multiplexers for outputting wavelength channels of a same carrier wavelength are connected to a same switching matrix of the first group.

In a preferred implementation each switching matrix of the second group has a number M of inputs for adding traffic and a number of at least 2M−1, preferably exactly 2M−1, outputs connected to inputs of switching matrices of the third group where M corresponds to the number of de-multiplexers/optical inputs. Furthermore it is preferable that each optical switching matrix of the first group has a number M of outputs for through traffic and a number of at least 2M−1, preferably exactly 2M−1, inputs connected to outputs of switching matrices of the third group.

The OXC advantageously further comprises a plurality of output channels for dropping traffic. In accordance with a second aspect of the invention an optical cross-connect (OXC) comprises:
a plurality of input channels for through traffic;
a plurality of output channels for through traffic;
a first group of optical switching matrices for connecting each through traffic input channel with any of the through traffic output channels, wherein each through traffic input channel is connected to an input of a switching matrix of the first group, and each through traffic output channel is connected to an output of a switching matrix of the first group;
a plurality of output channels for dropping traffic, characterised in that each drop traffic output channel is connected to an output of a fifth group of switching matrices, wherein inputs of the fifth group of switching matrices are connected to outputs of a fourth group of switching matrices and inputs of the fourth group of switching matrices are connected to outputs of the first group of switching matrices such that the switching matrices of the first, fourth and fifth groups form a Clos network.

Advantageously the OXC further comprises a plurality of multiplexers, each of which has an output for connecting to an optical output which carries WDM radiation comprising a plurality of wavelength channels, and a plurality of inputs for inputting one of these wavelength channels from one of the through traffic output channels. Preferably each multiplexer is connected to each switching matrix of the first group by one output channel. Advantageously each optical switching matrix of the fifth group has a number M of outputs for dropping traffic and a number of at least 2M−1, preferably exactly 2M−1, inputs connected to outputs of switching matrices of the fourth group where M corresponds to the number of multiplexers/optical outputs. Moreover, each optical switching matrix of the first group preferably has a number M of inputs for through traffic and a number of at least 2M−1, preferably exactly 2M−1, outputs connected to inputs of switching matrices of the fourth group.

Preferably the second group of optical switching matrices and the fifth group of optical switching matrices of the OXC in accordance with first and second aspects of the invention are identical.

BRIEF DESCRIPTION OF THE DRAWINGS

The invention will now be described, by way of example only, with reference to the accompanying drawings in which.

DETAILED DESCRIPTION OF THE PREFERRED EMBODIMENTS

Figure 2:
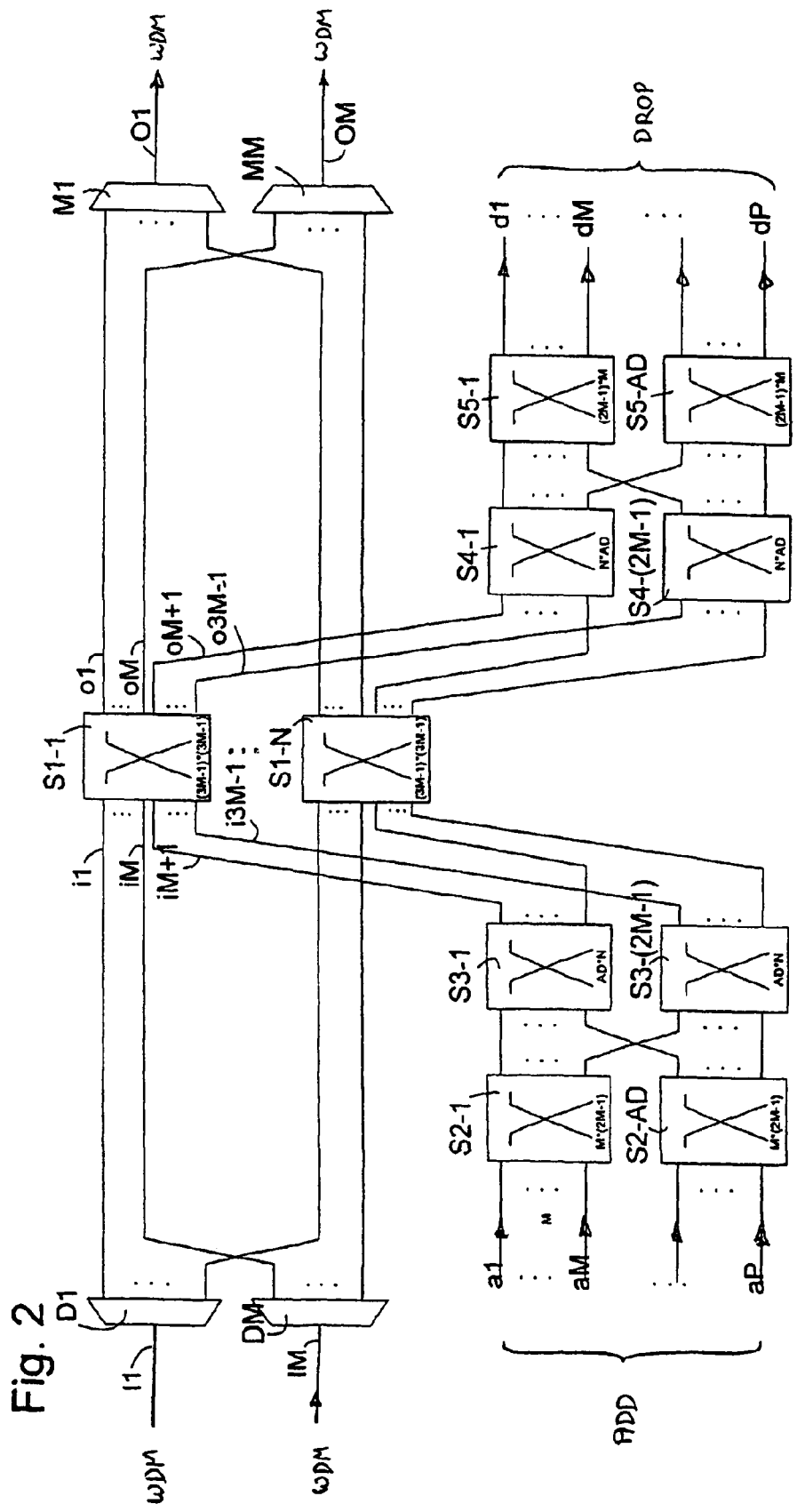
FIG. 2 shows a first embodiment of an optical cross-connect (optical switching arrangement) in accordance with the invention.

Referring to FIG. 2 there is shown an optical cross-connect (OXC) in accordance with the invention. The OXC is non-blocking and capable of cross-connecting selected wavelength channels arising on an input to a selected output. Such switching is termed through traffic switching. Additionally the OXC is capable of selectively dropping selected wavelength channels from a selected input line and selectively adding selected wavelength channels to a selected output line. The switching arrangement of the present invention thus provides a combined OXC/OADM function.

The OXC comprises a plurality M of optical fibre inputs I1 to IM and a plurality M of optical fibre outputs O1 to OM. Each optical input/output line is capable of supporting wavelength division multiplex radiation comprising a plurality N of wavelength channels having carrier wavelengths $\lambda_1$ to $\lambda_N$.

The OXC further comprises a respective de-multiplexer D1 to DM for each optical input I1 to IM; a respective multiplexer O1 to OM for each optical output O1 to OM; and five groups of optical switching matrices denoted S1-1 to S1-N, S2-1 to S2-AD, S3-1 to S3-(2M−1), S4-1 to S4 (2M−1) and S5-1 to S5-AD.

Figure 1:
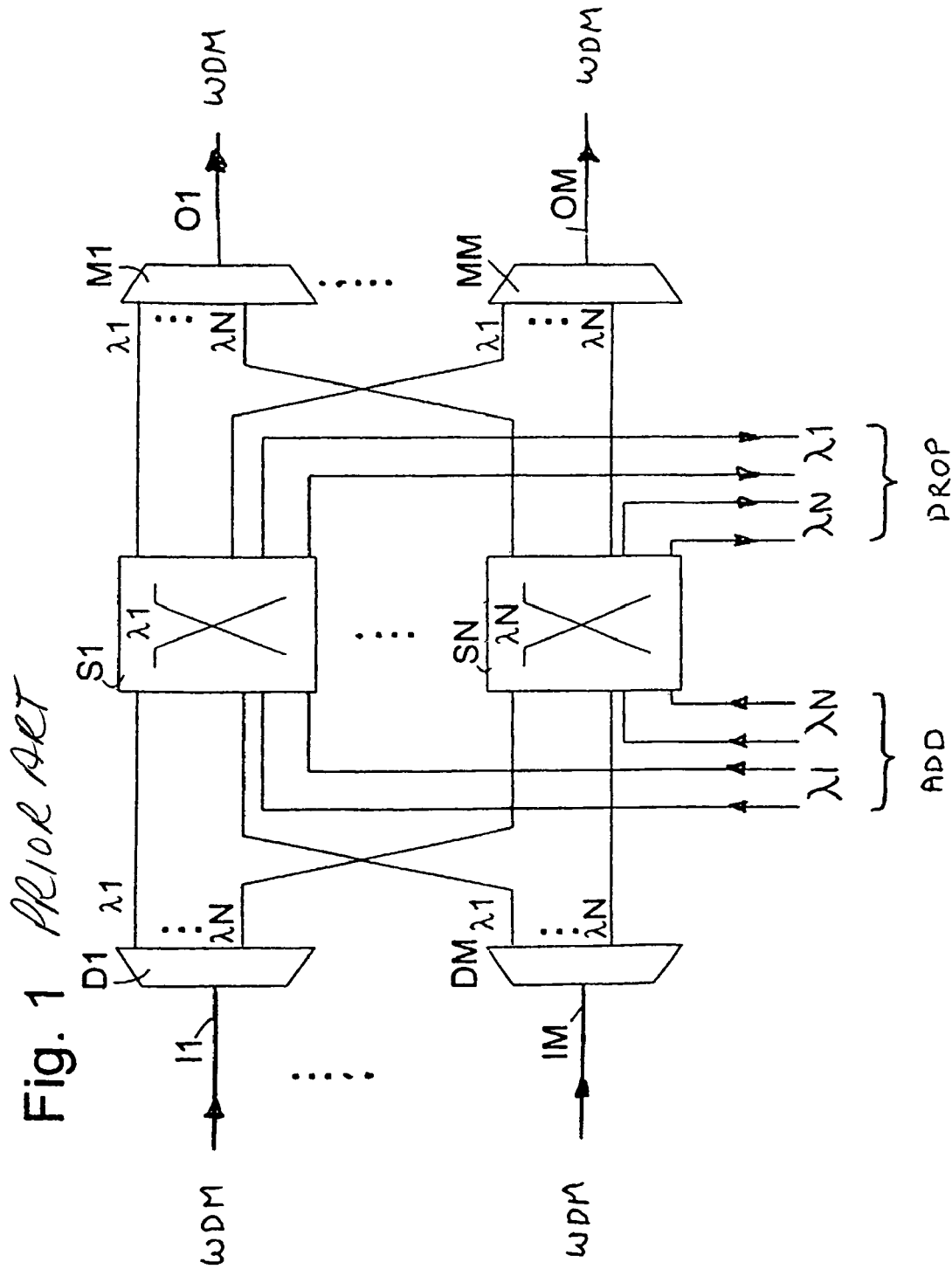
FIG. 1, already discussed, shows the basic architecture of a known optical cross-connect.

The first group of N of optical switching matrices S1-1 to S1-N has a function analogous to that of switching matrices S1 to SN of the OXC of FIG. 1 as described earlier with a respective switching matrix being assigned to each of the N wavelength carriers. As a result it will be appreciated that the OXC provides a single stage switching of through traffic. Each of the optical switching matrices S1-1 to S1-N is a square matrix having 3M−1 inputs (i1 to i3M−1) and 3M−1 outputs (o1 to o3M−1); i.e. they are (3M−1)×(3M−1) switching matrices. The first M inputs i1 to iM of the switching matrix, hereinafter referred to as through traffic inputs, are connected to the corresponding output (in terms of carrier wavelength) of the de-multiplexers D1 to DM. As with the OXC of FIG. 1, the N outputs of each of the de-multiplexers D1 to DM are connected to the inputs of the switching matrices S1-1 to S1-N so that each switching matrix S1-n where n=1 to N, has a wavelength channel having a carrier wavelength $\lambda n$ corresponding to this switching matrix is supplied from each de-multiplexer.

The first M outputs o1 to oM of each switching matrix, referred to as through traffic outputs, is connected to an input of one of the multiplexers M1 to MM, from the output of which originates the optical output O1 to OM. Since each multiplexer M1 to MM has only one connection to each of the switching matrices of the first group, ensures that no two switching matrices can supply to a multiplexer radiation having the same carrier wavelength.

The switching arrangement has a number P of inputs a1 to aP for adding add/drop traffic. These P inputs comprise the inputs of the second group of AD switching matrices S2-1 to S2-AD having M used inputs and 2M−1 used outputs (provided that P=M×AD. If P<AD, the number of used inputs of individual switching matrices of the second group may of course be smaller than M.)

Figure 3:
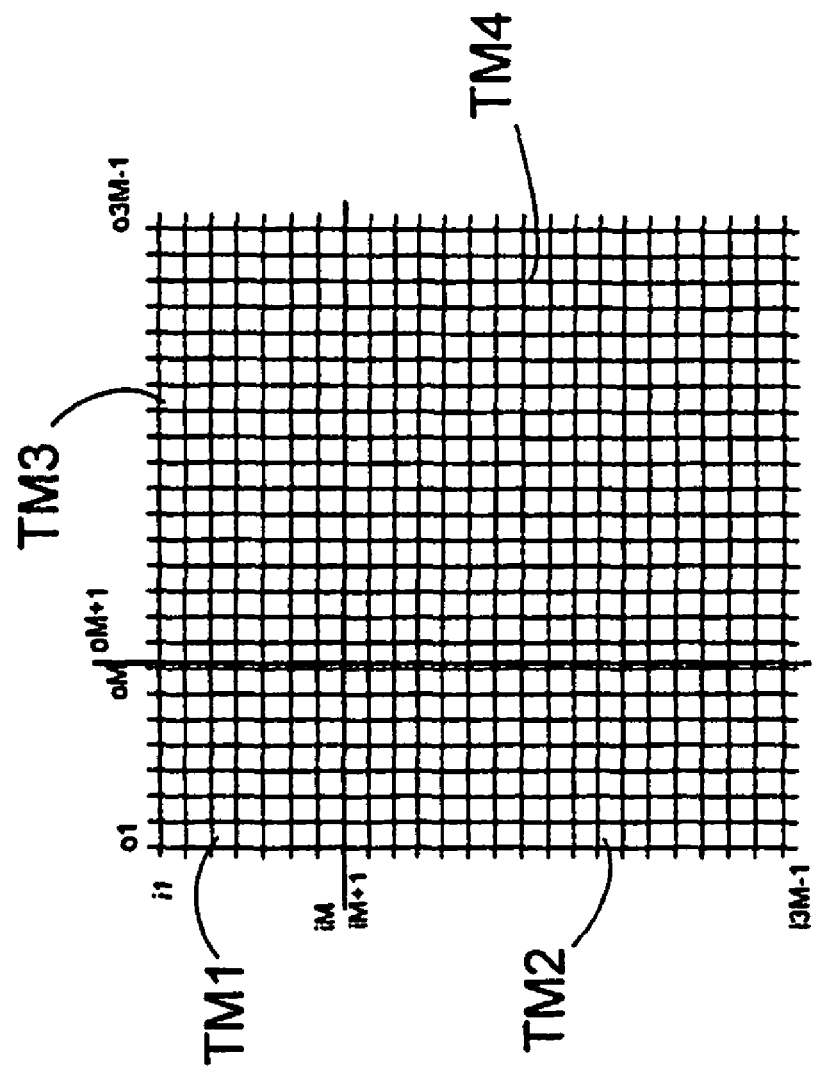
FIG. 3 is a schematic representation of an optical switching matrix.

This second group of switching matrices comprises a first stage of a three-stage Clos network, the second stage of which is formed by the third group of 2M−1 switching matrices S3-1 to S3-(2M−1) having AD used inputs and N outputs each. The third stage of the Clos network is constituted by the inputs iM+1 to i3M−1 of the switching matrices S1-1 to S1-N of the first group which are connected with the outputs of the matrices of the third group. As illustrated in FIG. 3, each matrix of the first group may be regarded as a combination of several switching sub-matrices, namely: a first square sub-matrix TM1 comprising the through traffic inputs i1 to iM and through traffic outputs o1 to oM and which is provided for routing the through traffic; a second sub-matrix TM2 having the inputs iM+1 to i3M−1 and outputs o1 to oM and which provides routing of add traffic added by switching matrices S2-1 to S2-AD, S3-1 to S3-(2M−1) to the through traffic, and two further sub-matrices TM3 and TM4 which will be discussed later on.

If it is required to upgrade the OXC to increase the number P of inputs for adding traffic, this can be achieved by adding further switching matrices to the second group. If the number of inputs of the switching matrices of the third group, which are physically present (but which have not yet been used before the upgrade) is not less than the number of switching matrices of the second group, those of the third group can continue to be used without modification; otherwise, they must be replaced by switching matrices having a larger number of inputs. Regarding the switching matrices of the first group, no modification is necessary.

Just like the local adding of traffic, the OXC according to the invention also supports the dropping of traffic arriving on one of the optical input I1 to IM but which are not to be routed further to one of output fibres O1 to OM. This purpose is served by the sub-matrix TM3 of each switching matrix of the first group, which is capable of selectively connecting each of the through traffic input channels i1 to iM to one of 2M−1 outputs oM+1 to o3M−1. The sub-matrices TM3 of the switching matrices of the first group thus constitute a first stage of a second Clos network, the second and third stage of which are formed by the fourth group of 2M−1 switching matrices S4-1 to S4-(2M−1) having N used inputs and AD used outputs, and the fifth group of AD switching matrices S5-1 to S5-AD having 2M−1 used inputs and M used outputs, respectively. The outputs of the switching matrices of the fifth group comprise the drop outputs d1 to dP of the OXC.

The sub-matrices TM4 of the switching matrices of the first group may remain unused; in case of future need, they can also be used to drop traffic arriving on the add inputs a1 to aP to a selected drop output d1 to dP.

The fact that the third group of switching matrices S3-1 to S3-(2M−1) comprises 2M−1 switching matrices ensures that a communication traffic applied to any add input a1 to aP can routed to any multiplexer Ml to MM and hence be routed to any output O1 to OM, provided of course that the desired output does not already carry communication traffic (wavelength channel) having the same carrier wavelength.

For example, consider the worst case, in which only a single carrier wavelength, λi, is free. To this carrier wavelength λi, the switching matrix S1-i of the first group is assigned. In order to be able to route radiation having the carrier wavelength 1 λi, it must be ensured that the add input channel aj is able to connect to the switching matrix S1-i. In the worst case, up to M−1 of its inputs, iM+1 to i3(M−1), may be occupied. If the number of occupied inputs were larger, none of the switching matrices outputs o1 to oM would be free, and the add traffic could not be routed, because the wavelength 1 λi of the desired output is already occupied. This contradicts the initial assumption, so that it cannot be correct.

In such a situation, among the switching matrices of the third group S3-1 to S3-(2M−1), up to M−1 matrices are unable to connect to the switching matrix S1-i. Of the remaining M matrices of the third group, however, the output leading to S1-i is free. This corresponds to a total number of M×AD inputs of switching matrices of the third group, by which the add traffic can be routed. Since only up to M×AD add traffic input channels a1 to aP are present, one of these inputs must necessarily be free. i.e. the third group must comprise at least 2M−1 switching matrices in order to ensure that add traffic input at an arbitrary add input aj can reach an output for which it is intended, provided that there is transmission capacity left on that output.

Analogously, the same number 2M−1 of matrices of the fourth group is necessary in order to ensure that any wavelength channel arriving at any input I1 to IM, which is to be processed locally (dropped), can be supplied to any drop output d1 to dP.

A further important advantage of the OXC architecture shown in FIG. 2 is that through traffic never need traverse more than one switching matrix when being routed through the OXC. The insertion loss of the OXC is thus very low and through traffic can be cross-connected by several OXC, without re-amplification or pulse shaping.

Figure 4:
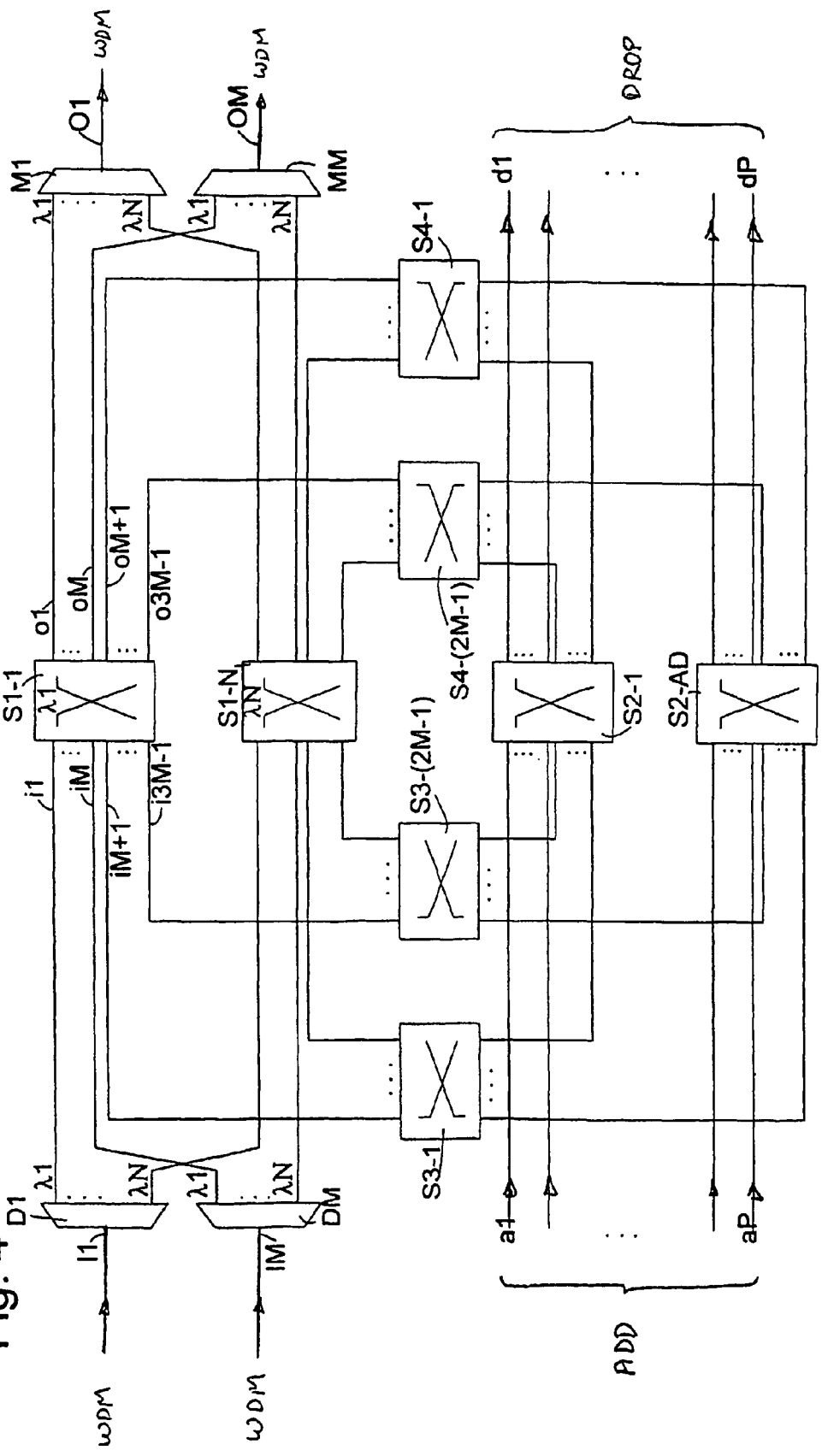
FIG. 4 is a second embodiment of an optical cross-connect in accordance with the invention.

A preferred further development of the OXC of the invention is shown in FIG. 4. The input and outputs, de-multiplexers and multiplexers and the switching matrices of the first, third and fourth groups are identical with those of the OXC of FIG. 2 and are therefore not described again.

In this embodiment, the switching matrices of the second and fifth groups are merged pair wise to switching matrices S2'-1 to S2'-AD. For simplicity's sake the group of switching matrices S2'-1 to S2'-AD will also be referred to as the second group of switching matrices. Like the switching matrices of the first group, the second group are square matrices each having 3M−1 inputs and 3M−1 outputs. Preferably they are identical to the matrices of the first group. Just like these and in analogy to FIG. 3, they may be regarded as subdivided into sub-matrices TM1 to TM4, wherein the sub-matrices TM3, having M inputs and 2M−1 outputs, correspond to the switching matrices of the second group from FIG. 2 and the sub-matrices TM2, having 2M−1 inputs and M outputs, correspond to the switching matrices of the fifth group from FIG. 2. The sub-matrices TM1, which directly connects add/drop-traffic input and output channels can be used for routing between these channels; the sub-matrices TM4 remain unused.

Although the sub-matrix TM4 is a large unused region in each switching matrix S2'-1 to S2'-AD, this solution is quite efficient and economical because conventional switching matrices which are manufactured in large volumes, and are accordingly competitively priced, are in general quadratic, so that the overall cost of the components for the OXC according to FIG. 4 is no higher than for the arrangement of FIG. 2. Since the number of components is less in the embodiment of FIG. 4, the OXC can be more compact.

In the above examples, the numbers of input and output channels for through traffic and the number of the input and output channels for add/drop traffic were assumed to be mutually equal. Whilst this is convenient for assessing the technical feasibility of the OXC architecture and may also suit the needs of the users, it is not a technical requirement.

The invention claimed is:

1. An optical cross-connect (OXC), comprising:
   a) a plurality of input channels for through traffic;
   b) a plurality of output channels for the through traffic;
   c) a first group of optical switching matrices for connecting each through traffic input channel to any of the through traffic output channels, each through traffic input channel being connected to an input of a switching matrix of the first group, and each through traffic output channel being connected to an output of the switching matrix of the first group; and
   d) a third plurality of input channels for adding traffic, each add traffic input channel being connected to an input of a second group of switching matrices, wherein outputs of the second group of switching matrices are connected to inputs of a third group of switching matrices, and outputs of the third group of switching matrices are connected to inputs of the first group of switching matrices such that the switching matrices of the second, third and first groups form a Clos network.

2. The OXC according to claim 1, and further comprising a plurality of demultiplexers, each having an input for connection to an optical input which carries WDM radiation comprising a plurality of wavelength channels, and a plurality of outputs for outputting one of these wavelength channels to one of the through traffic input channels.

3. The OXC according to claim 2, in which each demultiplexer is connected to each switching matrix of the first group by one input channel.

4. The OXC according to claim 2, in which the demultiplexers are wavelength demultiplexers outputting a respective wavelength channel to an output defined according to a carrier wavelength of the wavelength channel, and the outputs of various demultiplexers for outputting the wavelength channels of a same carrier wavelength are connected to a same switching matrix of the first group.

5. The OXC according to claim 1, wherein each switching matrix of the second group has a number M of inputs for adding traffic, and a number of at least 2M−1 outputs connected to inputs of switching matrices of the third group.

6. The OXC according to claim 1, wherein each optical switching matrix of the first group has a number M of outputs for through traffic, and a number of at least 2M−1 inputs connected to outputs of switching matrices of the third group.

7. The OXC according to claim 1, in which the second group of optical switching matrices are identical.

8. An optical cross-connect (OXC), comprising:
a) a plurality of input channels for through traffic;
b) a plurality of output channels for the through traffic;
c) a first group of optical switching matrices for connecting each through traffic input channel with any of the through traffic output channels, each through traffic input channel being connected to an input of a switching matrix of the first group, and each through traffic output channel being connected to an output of a switching matrix of the first group;
d) a plurality of output channels for dropping traffic, each drop traffic output channel being connected to an output of a fifth group of switching matrices, wherein inputs of the fifth group of switching matrices are connected to outputs of a fourth group of switching matrices, and inputs of the fourth group of switching matrices are connected to outputs of the first group of switching matrices such that the switching matrices of the first, fourth and fifth groups form a Clos network.

9. The OXC according to claim 8, and further comprising a plurality of multiplexers, each having an output for connecting to an optical output which carries WDM radiation comprising a plurality of wavelength channels, and a plurality of inputs for inputting one of these wavelength channels from one of the through traffic output channels.

10. The OXC according to claim 9, in which each multiplexer is connected to each switching matrix of the first group by one output channel.

11. The OXC according to claim 8, in which each optical switching matrix of the fifth group has a number M of outputs for dropping traffic, and a number of at least 2M−1 inputs connected to outputs of switching matrices of the fourth group.

12. The OXC according to claim 8, in which each optical switching matrix of the first group has a number M of inputs for through traffic, and a number of at least 2M−1 outputs connected to inputs of switching matrices of the fourth group.

13. The OXC according to claim 8, in which the fifth group of optical switching matrices are identical.

* * * * *

UNITED STATES PATENT AND TRADEMARK OFFICE
CERTIFICATE OF CORRECTION

| | | |
|---|---|---|
| PATENT NO. | : 7,787,768 B2 | Page 1 of 1 |
| APPLICATION NO. | : 10/508751 | |
| DATED | : August 31, 2010 | |
| INVENTOR(S) | : Pichler et al. | |

It is certified that error appears in the above-identified patent and that said Letters Patent is hereby corrected as shown below:

On the Title Page, in item (75), under "Inventors", Line 3, delete "Wivenhoe" and insert -- London (GB) --, therefor.

In Column 1, Line 63, after "back" insert -- to --.

In Column 2, Line 56, delete "channel" and insert -- channels --, therefor.

Signed and Sealed this
First Day of February, 2011

David J. Kappos
*Director of the United States Patent and Trademark Office*